United States Patent
Sherman

(10) Patent No.: US 8,034,254 B2
(45) Date of Patent: Oct. 11, 2011

(54) OPTICAL ADHESIVE FOR LIQUID CRYSTAL DISPLAY

(75) Inventor: Audrey A. Sherman, St. Paul, MN (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 11/962,488

(22) Filed: Dec. 21, 2007

(65) Prior Publication Data

US 2009/0161058 A1 Jun. 25, 2009

(51) Int. Cl.
*C09K 19/00* (2006.01)
*C09K 19/06* (2006.01)
*C09K 19/52* (2006.01)
*G03F 1/1333* (2006.01)

(52) U.S. Cl. .................. 252/299.01; 252/299.6; 430/20; 428/1.1; 349/1; 349/182; 349/183; 349/193

(58) Field of Classification Search .............. 252/299.01, 252/299.1, 299.6; 428/1.1; 430/20; 349/1, 349/182–183, 193
See application file for complete search history.

(56) References Cited

U.S. PATENT DOCUMENTS

| | | | |
|---|---|---|---|
| 4,152,189 A | 5/1979 | Guerin et al. | |
| 5,515,191 A | 5/1996 | Swirbel | |
| 6,721,019 B2* | 4/2004 | Kono et al. | 349/12 |
| 6,800,680 B2 | 10/2004 | Stark et al. | |
| 7,410,825 B2* | 8/2008 | Majumdar et al. | 438/106 |
| 7,414,313 B2* | 8/2008 | Majumdar et al. | 257/741 |
| 7,462,663 B2* | 12/2008 | Kim et al. | 524/262 |
| 2004/0202879 A1 | 10/2004 | Xia et al. | |
| 2006/0291055 A1 | 12/2006 | Gehlsen et al. | |
| 2007/0054133 A1* | 3/2007 | Sherman et al. | 428/447 |
| 2009/0153756 A1* | 6/2009 | Roberts et al. | 349/35 |

FOREIGN PATENT DOCUMENTS

| | | |
|---|---|---|
| JP | 54-088938 | 7/1979 |
| JP | 11-119210 | 4/1999 |
| JP | 2008-257062 | 10/2008 |

* cited by examiner

*Primary Examiner* — Geraldina Visconti

(74) *Attorney, Agent, or Firm* — Elizabeth A. Gallo

(57) ABSTRACT

A liquid crystal display includes first and second opposing substrates having first and second opposing surfaces, respectively, at least one of the surfaces having a metal disposed thereon, the substrates bonded together with an adhesive in contact with the metal, the adhesive comprising a blend of: a pressure sensitive adhesive component comprising at least one polymer having acid or base functionality, a high Tg polymer having a weight average molecular weight greater than 100,000 and having an acid or base functionality, and a crosslinker, wherein the functionality of the pressure sensitive adhesive component and the functionality of the high Tg polymer form an acid-base interaction when mixed.

25 Claims, 1 Drawing Sheet

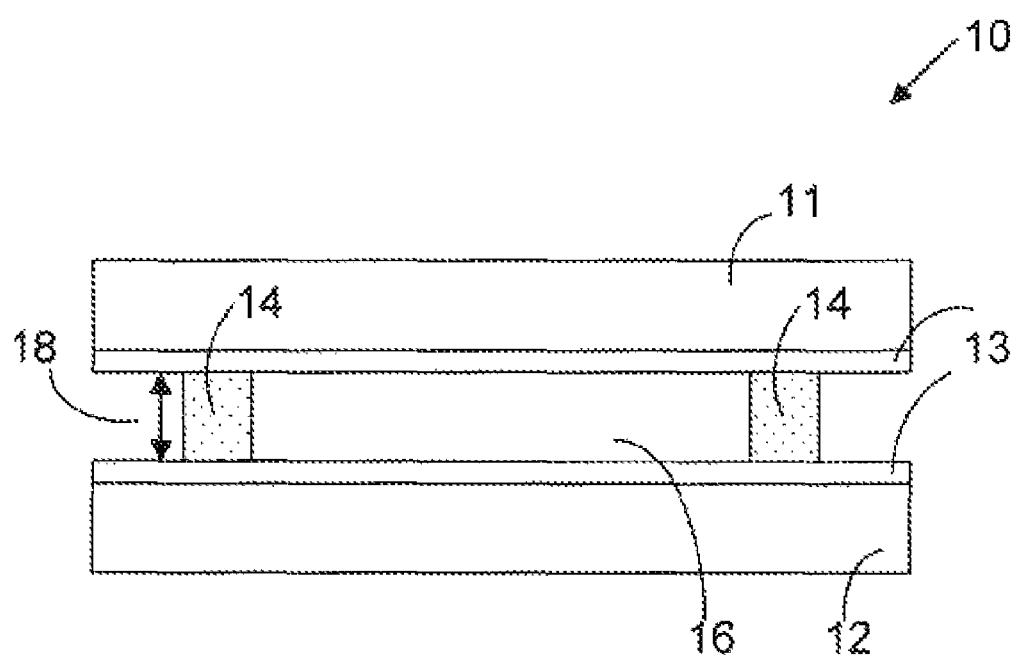

OPTICAL ADHESIVE FOR LIQUID CRYSTAL DISPLAY

FIELD OF INVENTION

This disclosure relates to adhesives, and particularly, to optical adhesives that can be used to make liquid crystal displays.

BACKGROUND

Devices employing liquid crystals have found use in a variety of electrooptical applications, in particular those which require compact, energy-efficient, voltage-controlled light valves, e.g., watch and calculator displays, as well as the flat-panel displays found in portable computers and compact televisions. Liquid crystal displays (LCDs) have a number of unique characteristics, including low voltage and low power of operation, which make them good candidates for use in non-emissive electrooptical display applications. Optical adhesives have been utilized in LCD applications. They are typically used in bonding processes during assembly of an original display as well as for after-market repair.

SUMMARY

In one aspect, a liquid crystal display is disclosed herein. The display comprises first and second opposing substrates having first and second opposing surfaces, respectively, at least one of the surfaces having a metal disposed thereon, the substrates bonded together with an adhesive in contact with the metal, the adhesive comprising a blend of: a pressure sensitive adhesive component comprising at least one polymer having acid or base functionality, a high Tg polymer having a weight average molecular weight greater than 100,000 and having an acid or base functionality, and a crosslinker, wherein the functionality of the pressure sensitive adhesive component and the functionality of the high Tg polymer form an acid-base interaction when mixed.

In another aspect, a method of manufacturing a liquid crystal display is disclosed herein. The method includes providing first and second substrates having first and second surfaces, respectively, at least one of the surfaces having a metal disposed thereon; and bonding the first and second substrates together using an adhesive, wherein the adhesive is in contact with the metal.

In yet another aspect, a liquid crystal display assembly is disclosed herein. The display assembly comprises: two light reflecting liquid crystal displays of different color, wherein at least one of the displays comprises the liquid crystal display disclosed herein.

These and other aspects of the invention are described in the detailed description below. In no event should the above summary be construed as a limitation on the claimed subject matter which is defined solely by the claims as set forth herein.

BRIEF DESCRIPTION OF THE DRAWING

The invention may be more completely understood in consideration of the following detailed description in connection with the following FIGURE:

The FIGURE shows a cross sectional view of an exemplary liquid crystal display.

DETAILED DESCRIPTION

The LCD disclosed herein may provide one or more advantages. For one, the LCD disclosed herein comprises an adhesive that provides adequate bonding yet is not corrosive towards components in the display, typically metal components. This is unexpected because the adhesive employed is an acidic adhesive, yet most acidic adhesives are corrosive towards metal components used in LCDs.

The adhesive may be optically transmissive, e.g., optically clear and may maintain such properties for a useful period of time under normal use conditions and as shown by accelerated aging tests. A balance of desired clarity, stability, bond strength, integrity, etc., can be achieved in an adhesive by selection of the combination of ingredients of the adhesive.

The LCD disclosed herein is also advantageous in that it can be manufactured using a variety of materials. For example, the liquid crystal composition can be made of commercially available materials. The substrates used to manufacture the device can be any of a variety of substrates, such as those known in the art of making LCDs. If desired, the LCD disclosed herein can be manufactured using specially designed materials and substrates. In addition, the liquid crystal composition can be of any color reflecting material.

The LCD disclosed herein may be advantageous in that it can be manufactured using conventional equipment. For example, conventional lamination and curing equipment can be used. The LCD manufacturing process is also amenable to roll-to-roll processes designed to handle flexible substrates. The use of conventional equipment can help to keep manufacturing costs low.

The FIGURE shows a cross sectional view of an exemplary LCD. LCD 10 comprises first and second opposing substrates, 11 and 12, respectively, with metal 13 disposed on inner surfaces of the substrates. The substrates are bonded together with adhesive 14 such that the adhesive is in contact with the metal. First and second opposing substrates are separated by cell gap 15. Disposed between the two substrates is liquid crystal composition 16 which generally fills the gap.

The first and second opposing substrates can comprise any useful material such as, for example, polymeric substrates, glass, ceramics, metals, metal oxides, or a combination thereof. The first and second opposing substrates may comprise a combination of a polymer substrate and glass, i.e., one may be a polymeric substrate, and the other substrate glass. In some embodiments, one or both substrates can be transparent to visible light. In other embodiments, one substrate is transparent to visible light and the other can reflect visible light; this combination of substrates is typically used in reflective displays. In some embodiments, the first and second substrates are formed from a suitable polymeric material that has sufficient mechanical properties such as strength and flexibility to be processed on a roll-to-roll apparatus. By roll-to-roll, what is meant is a process where material is wound onto or unwound from a support, as well as further processed in some way. Examples of further processes include coating, slitting, blanking, laminating, and exposing to radiation, or the like.

The substrate can include multiple layers of material such as a support layer, a primer layer, a hard coat layer, a decorative design, and the like. The substrate can be permanently or temporarily attached to an adhesive layer. For example, a release liner can be temporarily attached and then removed for attachment of the adhesive layer to another substrate. The release liner can be microstructured as well. These types of substrates generally comprise a plurality of features wherein at least two dimensions of the features are microscopic. The topical and/or cross-sectional views of the features, therefore, are microscopic. As used herein, microscopic refers to dimensions small enough so as to require an optic aid to the naked eye when viewed from any plane of view to determine its shape. One criterion is found in Modern Optic Engineering by W. J. Smith, McGraw-Hill, 1966, pages 104-105 whereby visual acuity is defined and measured in terms of the angular size of the smallest character that can be recognized. Normal visual acuity is considered to be when the smallest recognizable letter subtends an angular height of 5 minutes of arc on the retina. At a typical working distance of 250 mm (10 inches), this yields a lateral dimension of 0.36 mm (0.0145 inch) for this object.

The microstructures may be formed along portions or all of any number of surfaces of the substrate. For example, some surfaces may include sections that have microstructures and sections that are free from microstructures. Alternatively, substantially all of a surface may include microstructures. In addition, the shape and/or configuration of the microstructures can also vary. For example, microstructures can include one or more projections, one or more depressions, a combination of projections and depressions, ridges, posts, pyramids, hemispheres, cones, protrusion, or any other suitable feature. The shapes of the various projections and/or depressions can also vary. For example, some embodiments of projections and/or depressions can be rounded in shape (e.g., circular, semicircular, spherical, hemispherical, oval, pill-shaped, partially pill-shaped, etc.) or include a rounded portion, polygonal in shape or include a polygonal portion (e.g., triangular, squared, cubed including cube corners, tetrahedrical, rectangular, paralleopiped, pentagonal, hexagonal, etc.), an irregular shape, a regular shape, a pointed shape, a truncated shape, combinations thereof, or any other suitable shape. In at least some of these as well as in other embodiments, the projections and/or depressions may include or define one or more channels, valleys, wells, ridges, and the like, combinations thereof, or any other configuration.

The substrate can have a variety of functions such as, for example, providing flexibility, rigidity, strength or support, reflectivity, antireflectivity, polarization, or transmissivity (e.g., selective with respect to different wavelengths). That is, the substrate can be flexible or rigid; reflective or non-reflective; visibly clear, colored but transmissive, or opaque (e.g., not transmissive); and polarizing or non-polarizing.

Examples of polymers that may be used as the first and second substrates include thermoplastic polymers such as polyolefins, poly(meth)acrylates, polyamides, polyimides, polycarbonates, polyesters, and biphenol- or naphthalene-based liquid crystal polymers. Further examples of useful thermoplastics include polyethylene, polypropylene, polystyrene, poly(methylmethacrylate), polycarbonate of bisphenol A, poly(vinyl chloride), polyethylene terephthalate (PET), polyethylene naphthalate, and poly(vinylidene fluoride). Some of these polymers also have optical properties (e.g., transparency) that make them especially well-suited for certain display applications wherein they would support a patterned conductor, such as polycarbonates, polyimides, and/or polyesters. As used herein, "(meth)acrylate" is used to refer to both acryl and methacryl groups.

The first and second substrates may be flexible. The first and second substrates may have any useful thickness, ranging from about 5 µm to about 1000 µm, from about 25 µm to about 500 µm, from about 50 µm to about 250 µm, or from about 75 µm to about 200 µm.

The first and second substrates may each comprise a metal on an inner surface thereof. That is, the first substrate may comprise a first metal on a first inner surface thereof, and the second substrate may comprise a second metal on a second inner surface thereof, wherein the first and second inner surfaces are opposing surfaces. The metal may be present on either or both of the substrates in the form of a continuous coating thereon; alternatively, the metal may be present in the form of a discontinuous coating or pattern such that the surface(s) can be conductive. The pattern of the metal may depend in part on the type of display and design parameters, such as size of end user display, etc.

The conductive continuous or discontinuous layer of metal may be a transparent coating, for example, transparent to visible light. Useful conductive materials include indium tin oxide (ITO), tin antimony oxide, and zinc oxide. In some embodiments, the conductive continuous or discontinuous layer of metal has a generally uniform sheet resistivity. The conductive continuous or discontinuous layer can have any useful thickness such as, for example, a thickness of from about 10 to about 100 nm. The thickness of the conductive continuous or discontinuous layer may be limited if transparency is required, depending on the particular material being used. The conductive inner surfaces can be formed in any useful manner such as, for example, sputtering, chemical vapor deposition and the like.

The adhesive comprises an optically clear, compatibilized blend of a pressure sensitive adhesive (PSA) component, a high Tg polymer, and a crosslinker. Such blends are described in US 2004/0202879 A1 (Xia et al.). The PSA component comprises at least one polymer having acid or base functionality. The high Tg polymer has a weight average molecular weight greater than 100,000 and has acid or base functionality. The acid and base functionalities of the PSA component and the high Tg polymer form an acid-base interaction when mixed.

As used herein, the term "compatibilized" means that materials making up the adhesive composition form a stable multiphase morphology wherein the phases do not significantly coalesce and/or increase in size upon aging at temperatures at or above the glass transition temperature (Tg) of the materials. As used herein, high Tg polymer means a polymer with a glass transition temperature higher than polymers used to form a pressure sensitive adhesive, e.g., temperatures typically exceeding 20° C.

PSAs are well known to one of ordinary skill in the art to possess properties including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as PSAs include polymers designed and formulated to exhibit the requisite viscoelastic properties resulting in a desired balance of tack, peel adhesion, and shear holding power. PSAs are one example of a preferred adhesive blend in accordance with the present invention. The compatibilized blend formed from the mixture of PSA component and high Tg polymer is optionally also a pressure sensitive adhesive composition. Alternatively, the adhesive composition can be a laminating (heat-activated) adhesive.

As used herein, "polymer" refers to macromolecular materials having at least five repeating monomeric units, which may or may not be the same. The term polymer encompasses homopolymers and copolymers.

The PSA component and the high Tg polymer are compatibilized using a compatibilization scheme whereby the PSA component and the high Tg polymer are made to be compatible with one another due to a modification of their interfacial interactions. The compatibilization scheme comprises functionalizing at least one polymer in the PSA and the high Tg polymer in such a way that an acid-base interaction is present between the two materials. The acid-base interaction that is present between the polymers described herein may be described as a Lewis acid-base type interaction. Lewis acid-base interactions require that one chemical component be an electron acceptor (acid) and the other an electron donor (base). The electron donor provides an unshared pair of electrons and the electron acceptor furnishes an orbital system that can accommodate the additional unshared pair of electrons. The following general equation describes the Lewis acid-base interaction:

The acid-base interactions between the polymer in the PSA and the high Tg polymer reduce their interfacial tension leading to a reduction in the dispersed phase particle size, and a stabilization of the multiphase morphology. The interfacial tension between the materials reduces the domain size of the high Tg polymer. In some embodiments, particularly those in optical applications, the domain size of the high Tg polymer dispersed within the PSA is less than the wavelength of light to produce optical clarity. In some embodiments the domain size of the high Tg polymer is less than 100 nanometers. In other embodiments, the domain size of the high Tg polymer is less than 50 nanometers.

The compatibilized scheme is independent of the particular functionality on the respective polymer. That is, either the PSA component or the high Tg polymer can contain the acid or the base functionality. For example, an acid functionalized polymer in the PSA component can be paired with a base functionalized high Tg polymer. Alternatively, a base functionalized polymer of the PSA component can be paired with an acid functionalized high Tg polymer.

Acrylate and methacrylate monomers are referred to collectively herein as "(meth)acrylate" monomers. (Meth)acrylate polymers may be of copolymers, optionally in combination with other, non-(meth)acrylate, e.g., vinyl-unsaturated, monomers. Such polymers and their monomers are well-known in the polymer and adhesive arts, as are methods of preparing the monomers and polymers. One of skill will understand and recognize that such polymers can be useful to impart adhesive properties, and will understand their use in providing an adhesive as described herein.

As used in the present invention, an "acidic copolymer" is a polymer that is derived from at least one acidic monomer and at least one non-acidic copolymerizable monomer (i.e., a monomer that can not be titrated with a base). In one embodiment, at least one copolymerizable monomer is a (meth) acrylate monomer such as an alkyl(meth)acrylate monomer. The acidic copolymer may optionally be derived from other copolymerizable monomers, such as vinyl monomers and basic monomers, as long as the resultant copolymer can still be titrated with a base. Thus, usually more acidic monomers are utilized to prepare the acidic copolymers than basic monomers.

A "basic copolymer" is a polymer that is derived from at least one basic monomer and at least one nonbasic copolymerizable monomer (i.e., a monomer that cannot be titrated with an acid). Other monomers can be copolymerized with the basic monomers (e.g., acidic monomers, vinyl monomers, and (meth)acrylate monomers), as long as the basic copolymer retains its basicity (i.e., it can still be titrated with an acid). In one embodiment, at least one copolymerizable monomer is a (meth)acrylate monomer such as an alkyl (meth)acrylate monomer.

The pressure sensitive adhesive component comprises either an acidic or basic copolymer. When the PSA component comprises an acidic copolymer, the ratio of acidic monomers to non-acidic copolymerizable monomers utilized varies depending on desired properties of the resulting adhesive. The properties of the adhesive can also be adjusted by varying the amount of the acidic copolymer in the compatibilized blend of PSA component, high Tg polymer, and a crosslinker. Generally, as the proportion of acidic monomers used in preparing the acidic copolymer increases, cohesive strength of the resulting adhesive increases. The proportion of acidic monomers is usually adjusted depending on the proportion of acidic copolymer present in the blends of the present invention.

To achieve pressure sensitive adhesive characteristics, the corresponding copolymer can be tailored to have a resultant Tg of less than about 0° C. Particularly preferred pressure-sensitive adhesive copolymers are (meth)acrylate copolymers. Such copolymers typically are derived from monomers comprising from about 40 to about 98% by weight, preferably at least 70% by weight, more preferably at least 85% by weight, most preferably about 90% by weight, of at least one alkyl(meth)acrylate monomer that, as a homopolymer, has a Tg of less than about 0° C.

Examples of such alkyl(meth)acrylate monomers are those in which the alkyl groups comprise from about 4 carbon atoms to about 12 carbon atoms and include, but are not limited to, n-butyl acrylate, 2-ethylhexyl acrylate, isooctyl acrylate, isononyl acrylate, isodecyl, acrylate, and mixtures thereof. Optionally, other vinyl monomers and alkyl(meth) acrylate monomers which, as homopolymers, have a Tg greater than 0° C., such as methyl acrylate, methyl methacrylate, isobornyl acrylate, vinyl acetate, styrene, and the like, may be utilized in conjunction with one or more of the low Tg alkyl(meth) acrylate monomers and copolymerizable basic or acidic monomers, provided that the Tg of the resultant (meth) acrylate copolymer is less than about 0° C. In some embodiments, it is desirable to use (meth)acrylate monomers that are free of alkoxy groups.

When used, basic (meth)acrylate copolymers useful as the pressure sensitive adhesive component typically are derived from basic monomers comprising from about 2 to about 50% by weight, preferably from about 5 to about 30% by weight, of a copolymerizable basic monomer. When used to form the pressure sensitive adhesive component, acidic (meth)acrylate copolymers typically are derived from acidic monomers comprising from about 2 to about 30% by weight, preferably from about 2 to about 15% by weight, of a copolymerizable acidic monomer.

The high Tg polymer comprises either an acidic or basic copolymer, depending on the functionality chosen for the pressure sensitive adhesive component. For example, if the pressure sensitive adhesive component comprises an acidic copolymer, then the high Tg polymer will be a basic copolymer to form a compatibilized blend.

To achieve the high Tg characteristics of the polymer additive, the corresponding copolymer is tailored to have a resultant Tg of greater than about 20° C. In some embodiments, the Tg of the high Tg polymer additive is greater than 40° C., 50° C., or 60° C. In exemplary embodiments, the copolymers are (meth)acrylate copolymers. Such copolymers typically are derived from monomers comprising from about 40 to about 98% by weight, preferably at least 70% by weight, more preferably at least 85% by weight, most preferably about 90% by weight, of at least one alkyl (meth)acrylate monomer that, as a homopolymer, has a Tg of greater that about 20° C. Examples include vinyl monomers and alkyl (meth)acrylate monomers which, as homopolymers, have a Tg greater than 20° C., such as n-butyl methacrylate, methyl methacrylate, isobornyl acrylate, vinyl acetate, styrene, and the like.

Alkyl(meth)acrylate monomers with a Tg less than 0° C., such as monomers with alkyl groups comprising from about 4 carbon atoms to about 12 carbon atoms, including n-butyl acrylate, 2-ethylhexyl acrylate, isooctyl acrylate, isononyl acrylate, isodecyl acrylate, and mixtures thereof, may be utilized in conjunction with one or more of the high Tg alkyl (meth)acrylate monomers and copolymerizable basic or acidic monomers, provided that the Tg of the resultant (meth) acrylate copolymer is greater than about 20° C.

When the high Tg polymer is a basic copolymer, it is typically a basic (meth)acrylate copolymer. Basic (meth) acrylate copolymers typically are derived from basic monomers comprising from about 2 to about 50% by weight, preferably from about 5 to about 30% by weight, of a copolymerizable basic monomer.

When the high Tg polymer additive is an acidic copolymer, it is typically an acidic (meth)acrylate copolymer. Acidic (meth)acrylate copolymers typically are derived from acidic monomers comprising from about 2 to about 30% by weight, preferably from about 2 to about 15% by weight, of a copolymerizable acidic monomer.

In some embodiments, the copolymer of the high Tg polymer typically has an weight average molecular weight greater than 100,000. Higher molecular weight high Tg polymer is desirable because it enhances the thermal stability of the compatibilized blend, especially at elevated temperatures and extreme conditions. To utilize a high molecular weight high Tg polymer, other attributes of the high Tg polymer (such as monomer selection) and of the compatiblized blend (such as acid-base interaction level) are varied to retain compatability.

Useful acidic monomers include, but are not limited to, those selected from ethylenically unsaturated carboxylic acids, ethylenically unsaturated sulfonic acids, ethylenically unsaturated phosphonic acids, and mixtures thereof. Examples of such compounds include those selected from acrylic acid, methacrylic acid, itaconic acid, fumaric acid, crotonic acid, citraconic acid, maleic acid, oleic acid, B-carboxyethyl acrylate, 2-sulfoethyl methacrylate, styrene sulfonic acid, 2-acrylamido-2-methylpropane sulfonic acid, vinyl phosphonic acid, and the like, and mixtures thereof.

Due to their availability, acidic monomers of the present invention are typically the ethylenically unsaturated carboxylic acids. When even stronger acids are desired, acidic monomers include the ethylenically unsaturated sulfonic acids and ethylenically unsaturated phosphonic acids. Sulfonic and phosphonic acids generally provide a stronger interaction with a basic polymer. This stronger interaction can lead to greater improvements in cohesive strength, as well as higher temperature resistance and solvent resistance of the adhesive.

A wide variety of basic monomers are useful in the present invention. In some embodiments, the basic monomer is a nitrogen-containing monomer, such as those of Formula (I):

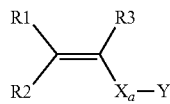

I wherein a is 0 or 1;

$R_1$, $R_2$, and $R_3$ are independently selected from H— and $CH_3$— or other alkyl group;

X is selected from an ester or amide group; and

Y is an alkyl group, a nitrogen-containing aromatic, nitrogen-containing group, such as the group:

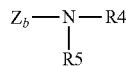

wherein

Z is a divalent linking group (typically about 1 to 5 carbon atoms);

b is 0 or 1; and $R_4$ and $R_5$ are selected from hydrogen, alkyl, aryl, cycloalkyl, and arenyl groups.

$R_4$ and $R_5$ in the above group may also form a heterocycle. In all embodiments, Y, $R^1$, and $R^2$ may also comprise heteroatoms, such as O, S, N, etc. While Formula I summarizes the majority of basic monomers useful in the present invention, other nitrogen-containing monomers are possible if they meet the definition of a basic monomer (i.e., can be titrated with an acid).

Exemplary basic monomers include N,N-dimethylaminopropyl methacrylamide (DMAPMAm); N,N-diethylaminopropyl methacrylamide (DEAPMAm); N,N-dimethylaminoethyl acrylate (DMAEA); N,N-diethylaminoethyl acrylate (DEAEA); N,N-dimethylaminopropyl acrylate (DMAPA); N,N-diethylaminopropyl acrylate (DEAPA); N,N-dimethylaminoethyl methacrylate (DMAEMA); N,N-diethylaminoethyl methacrylate (DEAEMA); N,N-dimethylaminoethyl acrylamide (DMAEAm); N,N-dimethylaminoethyl methacrylamide (DMAEMAm); N,N-diethylaminoethyl acrylamide (DEAEAm); N,N-diethylaminoethyl methacrylamide (DEAEMAm); N,N-dimethylaminoethyl vinyl ether (DMAEVE); N,N-diethylaminoethyl vinyl ether (DEAEVE); and mixtures thereof. Other useful basic monomers include vinylpyridine, vinylimidazole, tertiary amino-functionalized styrene (e.g., 4-(N,N-dimethylamino)-styrene (DMAS), 4-(N,N-diethylamino)-styrene (DEAS)), N-vinyl pyrrolidone, N-vinyl caprolactam, acrylonitrile, N-vinyl formamide, (meth)acrylamide, and mixtures thereof High Tg monomers are generally those monoethylenically unsaturated monomers which as homopolymers have a Tg greater than about 20° C. Preferably, the high Tg polymer is derived from monoethylenically unsaturated monomers, which as homopolymers have a Tg of greater than 20° C. Typically the high Tg polymer is independently derived from monoethylenically unsaturated monomers selected from the group consisting of (meth)acrylate esters of non-tertiary alkyl alcohols, the alkyl groups of which comprise from about 1 to about 20, preferably about 1 to about 18 carbon atoms as shown in Formula TI (below); acidic or basic monomers as defined above; vinyl-terminated monomers; and combinations thereof. In most embodiments, the high Tg polymers are independently derived from (meth)acrylate monomers, although, for certain formulations, vinyl-terminated monomers, such as styrene, may show comparable or superior results. Examples of suitable monomers useful in the present invention include, but are not limited to, t-butyl acrylate, methyl methacrylate, ethyl methacrylate, isopropyl methacrylate, n-butyl methacrylate, isobutyl methacrylate, s-butyl methacrylate, t-butyl methacrylate, stearyl methacrylate, phenyl methacrylate, cyclohexyl methacrylate, isobornyl acrylate, isobornyl methacrylate, benzyl methacrylate, bromoethyl methacrylate, 2-hydroxyethyl methacrylate, hydroxypropyl methacrylate, glycidyl methacrylate, ally methacrylate, styrene, vinyl acetate, vinyl chloride.

(Meth)acrylate copolymers useful in the invention contain at least one monofunctional unsaturated monomer selected from the group consisting of (meth)acrylate esters of non-tertiary alkyl alcohols, the alkyl groups of which comprise from about 1 to about 20, preferably about 1 to about 18 carbon atoms, such as those of Formula (II):

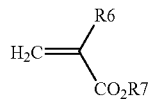

wherein $R^6$ is H or $CH_3$, the latter corresponding to where the (meth)acrylate monomer is a methacrylate monomer, and $R^7$ is a linear, branched, aromatic, or cyclic hydrocarbon group.

When $R^6$ is a hydrocarbon group, it can also include heteroatoms (e.g., oxygen or sulfur). Criteria to consider when selecting $R^7$ include cost and the form in which the copolymer will be incorporated into the adhesive.

Examples of suitable (meth)acrylate monomers useful in the present invention include, but are not limited to, benzyl methacrylate, n-butyl acrylate, n-butyl methacrylate, cyclohexyl acrylate, cyclohexyl methacrylate, decyl acrylate, 2-ethoxy ethyl acrylate, 2-ethoxy ethyl methacrylate, ethyl acrylate, 2-ethylhexyl acrylate, ethyl methacrylate, n-hexadecyl acrylate, n-hexadecyl methacrylate, hexyl acrylate, hydroxy-ethyl methacrylate, hydroxy ethyl acrylate, isoamyl acrylate, isobornyl acrylate, isobornyl methacrylate, isobutyl acrylate, isodecyl acrylate, isodecyl methacrylate, isononyl acrylate, isooctyl acrylate, isooctyl methacrylate, isotridecyl acrylate, lauryl acrylate, lauryl methacrylate, 2-methoxy ethyl acrylate, methyl acrylate, methyl methacrylate, 2-methyl butyl acrylate, 4-methyl-2-pentyl acrylate, 1-methylcyclohexyl methacrylate, 2-methylcyclohexyl methacrylate, 3-methylcyclohexyl methacrylate, 4-methylcyclohexyl, methacrylate, octadecyl acrylate, octadecyl methacrylate, n-octyl acrylate, n-octyl methacrylate, 2-phenoxy ethyl methacrylate, 2-phenoxy ethyl acrylate, propyl acrylate, propyl methacrylate, n-tetradecyl acrylate, n-tetradecyl methacrylate, and mixtures thereof.

When used, vinyl monomers useful in the acidic and basic copolymers include vinyl esters (e.g., vinyl acetate), styrene, substituted styrene (e.g., a-methyl styrene), vinyl halide, vinyl propionate, and mixtures thereof. Other useful vinyl monomers include macromeric (meth)acrylates such as (meth)acrylate-terminated styrene oligomers and (meth) acrylate-terminated polyethers, such as are described in WO 84/03837 and EP 140 941.

The polymers herein can be prepared using any conventional free radical polymerization method, including solution, radiation, bulk, dispersion, emulsion, and suspension processes. Useful methods are described in US 2004/0202879 A1 (Xia et al.) and references cited therein. Thermal free radical initiators, chain transfer agents, solvents, etc. may be used.

The crosslinker is incorporated into the blend in order to increase cohesive strength of the adhesive. Two types of crosslinking additives are commonly used. The first crosslinking additive is a thermal crosslinking additive such as a multifunctional aziridine. One example is 1,1'-(1,3-phenylene dicarbonyl)-bis-(2-methylaziridine) (Bisamide). Such chemical crosslinkers can be added into the solvent-based PSA after polymerization and activated by heat during oven drying of the coated adhesive. Isocyanate and epoxy crosslinkers can also be used.

In another embodiment, chemical crosslinkers that rely upon free radicals to carry out the crosslinking reaction may be employed. Reagents such as, for example, peroxides serve as a source of free radicals. When heated sufficiently, these precursors will generate free radicals which bring about a crosslinking reaction of the polymer. A common free radical generating reagent is benzoyl peroxide. Free radical generators are required only in small quantities, but generally require higher temperatures to complete a crosslinking reaction than those required for the bisamide reagent.

The second type of chemical crosslinker is a photosensitive crosslinker which is activated by high intensity ultraviolet (UV) light. Two common photosensitive crosslinkers used are benzophenone and copolymerizable aromatic ketone monomers as described in U.S. Pat. No. 4,737,559. Another photocrosslinker, which can be post-added to the solution composition and activated by UV light is a triazine, for example, 2,4-bis(trichloromethyl)-6-(4-methoxy-phenyl)-s-triazine. These crosslinkers are activated by UV light generated from artificial sources such as medium pressure mercury lamps or a UV blacklight.

Hydrolyzable, free-radically copolymerizable crosslinkers, such as monoethylenic ally unsaturated mono-, di-, and trialkoxy silane compounds including, but not limited to, methacryloxypropyltrimethoxysilane (available from Gelest, Inc., Tullytown, Pa.), vinyldimethylethoxysilane, vinylmethyl diethoxysilane, vinyltriethoxysilane, vinyltrimethoxysilane, vinyltriphenoxysilane, and the like, are also useful crosslinking agents. Multi-functional acrylates are useful for bulk or emulsion polymerization. Examples of useful multifunctional acrylate crosslinking agents include, but are not limited to, diacrylates, triacrylates, and tetraacrylates, such as 1,6-hexanediol diacrylate, poly(ethylene glycol) diacrylates, polybutadiene diacrylate, polyurethane diacrylates, and propoxylated glycerin triacrylate, and mixtures thereof Crosslinking may also be achieved using high energy electromagnetic radiation such as gamma or e-beam radiation.

The amount and identity of crosslinker is tailored depending upon application of the adhesive. Typically, the crosslinker is present in amounts less than 5 parts based on total dry weight of adhesive. More specifically, the crosslinker is present in amounts from 0.01 pats to 1 part based on total dry weight of the adhesive.

Following copolymerization, other additives may be added to the adhesive provided the additive causes no adverse affect to the desired properties, such as optical clarity and environmental stability over time. For example, compatible tackifiers and/or plasticizers may be added to aid in optimizing the ultimate tack and peel properties of the PSA. The use of such tack-modifiers is common in the art. Examples of useful tackifiers include, but are not limited to, rosin, rosin derivatives, polyterpene resins, coumarone-indene resins, and the like. Plasticizers which may be added to the adhesive may be selected from a wide variety of commercially available materials. In each case, the added plasticizer must be compatible with the PSA. Representative plasticizers include polyoxyethylene aryl ether, dialkyl adipate, 2-ethylhexyl diphenyl phosphate, t-butylphenyl diphenyl phosphate, 2-ethylhexyl adipate, toluenesulfonamide, dipropylene glycol dibenzoate, polyethylene glycol dibenzoate, polyoxypropylene aryl ether, dibutoxyethoxyethyl formal, and dibutoxyethoxyethyl adipate. UV stabilizers as known in the art may also be added. Additional ingredients can be selected to balance properties of clarity, bond strength, integrity, stability, etc., as will be appreciated.

The PSA component and the high Tg polymer may be present in the adhesive in any relative amounts that, in combination with the crosslinker and any other optional components, will result in a useful balance of properties of the adhesive, preferably meaning at least an optically clear, stable adhesive. For the PSA component, an amount is included to provide the functional properties of a pressure sensitive adhesive, including a useful amount of tack or tackiness and other PSA properties. These and other properties of pressure sensitive adhesives, and the amounts necessary to achieve these properties, are well understood. For the high Tg polymer, any amount can be included to provide sufficient stability and clarity, in a given application. Preferably, an amount of high Tg polymer can be included to maintain optical clarity of the adhesive during use and over time, under conditions that would be experienced by the adhesive or a product that incorporates the adhesive. In particular, the amount of high Tg polymer can provide a bond that does not delaminate or bubble over time, under a variety of environmental conditions. The required bond strength will depend on the materials being bonded, but preferred amounts of high Tg polymer can provide adhesives that will not bubble or delaminate over time when used to bond an outgassing material to a low moisture vapor transfer material.

Overall, the PSA component and high Tg polymer can be included in the adhesive in relative amounts that will provide a desired combination of PSA properties, adhesive bond properties, and optical clarity, with stability of these properties and clarity over time during use. In general, depending on factors such as the chemical identities and molecular weights, amount of cross-linking, etc., among other variables, less than about 50 parts by weight high Tg polymer based on 100 parts by weight total PSA component and high Tg polymer can provide a compatibilized adhesive composition that will have acceptable optical clarity. Exemplary embodiments include amounts less than about 30 parts by weight high Tg polymer based on 100 parts by weight total PSA component and high Tg polymer. At the low end, an amount of high Tg polymer useful to provide sufficient bond properties can depend on factors such as the type of high Tg polymer and PSA polymer, but in general, useful amounts can be from at least about 5 parts by weight high Tg polymer based on 100 parts by weight total high Tg polymer and PSA component. In most embodiments, the range of the two components can be from about 10 to about 30 parts by weight high Tg polymer based on a total of 100 parts by weight high Tg polymer and PSA component.

The pressure sensitive adhesive component and high Tg polymer additive can be blended by traditional methods known to those skilled in the art. Such methods include mixing, mechanical rolling, hot melt blending, etc. Typically, the pressure sensitive adhesive component and the high Tg polymer additive are mixed in solution.

The adhesive may be applied by any conventional application method, including but not limited to gravure coating, curtain coating, slot coating, spin coating, screen coating, transfer coating, brush or roller coating, and the like. Exemplary embodiments involve coating the adhesive composition in a solvent. In alternative embodiments, copolymers are hot-melt coatable, followed by subsequent cross-linking.

The particular adhesive used may depend on a variety of factors, e.g., the particular design of the cell, the desired size of the outer adhesive region, and the desired performance of the cell in a particular environment. In some embodiments, it may be desirable for the adhesive to have little or no detrimental effect on other components of the cell. For example, it may be desirable for the adhesive to have little or no detrimental effect on the electronic components of the cell such as the conductive material which may be present on one or both of the substrates. The adhesive may be selected by subjecting the cell to appropriate environmental testing, typically elevated temperature and humidity conditions as described above. Color shifts can be measured by recording reflectance spectra of the planar state both before and after testing. For a given display, the amount of color shifting can then be used to decide if the adhesive is adequate, depending on acceptable product specifications.

In general, the cell gap depends upon a number of factors including the maximum reflection desired given reasonable drive voltages. The maximum reflection obtainable for a given set of drive voltage conditions can, in turn, depend on a number of factors such as the birefringence of the liquid crystal material. Other factors include the quality of the phase separation of the liquid crystal from the polymer matrix.

The cell gap may be anywhere from about 1.5 to about 200 µm depending on any number of factors described herein. In some embodiments, the cell gap may be from about 6 to about 100 µm, or from about 6 to about 50 µm. The adhesive may comprise particles in order to set the cell gap. Useful particles may include poly(divinylbenzene), polystyrene, glass or other particles have a diameter of from about 1.5 to about 200 µm.

The adhesive may be used in a cell construction such as the one shown in the FIGURE. That is, the adhesive may be disposed between the two substrates with little or no adhesive visible outside of the cell. The amount of adhesive used in this type of construction may depend on how much area is available for sealing the display as well as the desired cell gap. In some embodiments, for this type of construction, transfer tapes and liquid-type adhesives such as curable adhesives may be used. In some embodiments, a method of making the liquid crystal display comprises: providing first and second substrates having first and second surfaces, respectively, at least one of the surfaces having a metal disposed thereon; and bonding the first and second substrates together using an adhesive, wherein the adhesive is in contact with the metal. At any point during the process, lamination may be used to further create the desired seal and improve bonding, as well as to set the gap(s) of the display. Further, if a curable adhesive is used, it may be cured at any point during the process. The adhesive may also be applied to the second substrate instead of the first, followed by contacting the adhesive with the first substrate instead of the second. The construction shown in the FIGURE can also be prepared by disposing the liquid crystal composition onto the first or second substrate before or after the adhesive is applied. With the liquid crystal composition and adhesive disposed on the first or second substrate, the other substrate can then be placed in contact with the adhesive. The adhesive may be used in a cell construction wherein the adhesive is present on one or both of the outer surfaces of the first and second opposing substrates. Further, a cell construction in which adhesive is present on only the outer surfaces may be employed.

The liquid crystal composition forms a bistable reflective cholesteric liquid crystal display. Application of an electric field (E) across the conductive inner surfaces causes the liquid crystal to be aligned in either the reflective PL state or the scattering FC state. Both of these states are stable at E=0, thus the textures are locked in and will remain intact until acted upon again (i.e., the device is bistable). Switching from the PL to the FC state requires a low voltage pulse while the return from FC to PL requires a higher voltage pulse to drive the device into a homeotropic state which then relaxes to the final planar state. Desirable voltages for switching the device from FC to PC are less than about 100 V, or less than about 60 V. An illustrative drive scheme for switching single pixel cholesteric liquid crystal display (i.e., ChLCD) cells is described by Deng-Ke Yang, et al. (Annu. Rev. Mater. Sci. 1997, 27, 117-146). According to reflectance versus voltage plots described in Yang, et al., ChLCD cells can be switched to a voltage value $V_5$ at which the cell is in the PL state or $V_2$ at which point the cell is in the FC state. The associated pulse trains (frequency and amplitude) can be practiced by one of ordinary skill in the art.

Exemplary compositions described in the pending disclosure herein give corresponding stable planar state reflection. By stable state reflection it is meant that after being driven to the planar state by a voltage $V_5$ the cell experiences no loss of reflection after standing at ambient conditions for about three days.

The liquid crystal composition may comprise any type of components that exhibit liquid crystallinity. In some embodiments, the liquid crystal composition comprises a cholesteric liquid crystal material. Cholesteric liquid crystal materials generally include compounds with molecular units that are chiral in nature (e.g., molecules that do not possess a mirror plane) and molecular units that are mesogenic in nature (e.g., molecules that exhibit liquid crystal phases). Cholesteric liquid crystal materials can be polymers. Cholesteric liquid crystal materials may also include achiral liquid crystal compounds (nematic) mixed with or containing a chiral unit. Cholesteric liquid crystal materials include compounds having a cholesteric liquid crystal phase in which the director (the unit vector that specifies the direction of average local molecular alignment) of the liquid crystal rotates in a helical fashion along the dimension perpendicular to the director. Cholesteric liquid crystal materials are also referred to as chiral nematic liquid crystal materials. The pitch of the cholesteric liquid crystal material is the distance (in a direction perpendicular to the director and along the axis of the cholesteric helix) that it takes for the director to rotate through 360 degrees. This distance is generally 100 nm or more.

The pitch of a cholesteric liquid crystal material can be induced by mixing or otherwise combining (e.g., by copolymerization) a chiral compound with a nematic liquid crystal compound. The cholesteric phase can also be induced by a chiral non-liquid crystal material. The pitch may depend on the relative ratios by weight of the chiral compound and the nematic liquid crystal compound or material. The helical twist of the director results in a spatially periodic variation in the dielectric tensor of the material, which in turn gives rise to the wavelength selective reflection of light. For example, the pitch can be selected such that the Bragg reflection is peaked in the visible, ultraviolet, or infrared wavelength regimes of light.

Cholesteric liquid crystal materials, including cholesteric liquid crystal polymers, are generally known and typically any of these materials can be used. Examples of suitable cholesteric liquid crystal polymers are described in U.S. Pat. Nos. 4,293,435; 5,332,522; 5,886,242; 5,847,068; 5,780,629; and 5,744,057. Other cholesteric liquid crystal materials can also be used. A cholesteric liquid crystal material may be selected for a particular application or optical body based on one or more factors including, for example, refractive indices, surface energy, pitch, processability, clarity, color, low absorption in the wavelength of interest, compatibility with other components (e.g., a nematic liquid crystal compound, etc.), molecular weight, ease of manufacture, availability of the liquid crystal compound or monomers to form a liquid crystal polymer, rheology, method and requirements of curing, ease of solvent removal, physical and chemical properties (for example, flexibility, tensile strength, solvent resistance, scratch resistance, and phase transition temperature), and ease of purification.

The liquid crystal composition may comprise a photocurable or thermally curable composition. In some embodiments, the liquid crystal composition comprises a ChLC/monomer prepolymer composition that may be cured via radiation in a range of from about 0.1 to about 10 mW/cm² or from about 0.2 to about 3 mW/cm². The resulting cured composition comprises a ChLC/polymer composition. As used herein, "liquid crystal composition" refers to both the prepolymer composition and the resulting cured composition.

The prepolymer composition is formed by a process in which the prepolymer composition and a liquid crystal material are mixed and the one or more monomers polymerized. In some embodiments, the prepolymer composition forms a single phase, and as the composition polymerizes, the polymer separates from the liquid crystal forming liquid crystal domains (e.g., droplets) dispersed within a polymer matrix. This phase separation process is termed polymerization induced phase separation (PIPS). In the PIPS process, the polymer phase usually separates from the liquid crystal during polymerization as the polymer chain length increases.

The liquid crystal composition includes a liquid crystal material, a prepolymer composition, and a photoinitiator or thermal initiator. The components are chosen so that they form a single phase until polymerized. The liquid crystal material can be any useful liquid crystal such as, for example, a ChLC material or a nematic liquid crystal material. The liquid crystal material can be present in the composition in any useful amount, for example, from about 60 to about 95 wt. %, or from about 70 to about 95 wt. %, relative to the total weight of the composition.

The prepolymer composition can comprise one or more monomers and/or oligomers. In some embodiments, the prepolymer composition comprises a silane-containing (meth)acrylate monomer and a multifunctional (meth)acrylate monomer. In some embodiments, the prepolymer composition comprises: a silane-containing (meth)acrylate monomer, a (meth)acrylic resin monomer, and a multifunctional (meth)acrylate monomer. The silane-containing monomer can be hydrolyzable or non-hydrolyzable. Illustrative silane-containing monomers include alkoxysilanes and (meth)acryloxysilanes, represented by the formula:

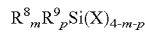

wherein, $R^8$ is independently a (meth)acryloxy or (meth)acryloxyalkyl group; $R^9$ is independently selected from the group consisting of hydrogen, $(C_1-C_{12})$alkyl, $(C_6-C_{12})$aryl, or $(C_7-C_{17})$arylalkyl; X is a hydrolyzable or non-hydrolyzable group; m is an integer from 1 to 3; and p is 0, 1, or 2 with the proviso that (m+p) is an integer from 1 to 3. Particularly useful silane-containing monomers include (methacryloxymethyl)phenyldimethylsilane, methacryloxypropyl trimethoxysilane, methacryloxypropyl dimethylethoxysilane, methacryloxypropyl trimethylsilane, and monomers described in U.S. Ser. No. 11/557,540 (Roberts, et al.) filed on Nov. 8, 2006.

The multifunctional (meth)acrylate monomer may be represented by the formula:

wherein: $R^{10}$ is independently selected from acryloxy or methacryloxy; $R^{11}$ is $(C_1-C_{20})$alkyl or $(C_7-C_{17})$arylalkyl, optionally containing one or more heteroatomic substitutions independently selected from S, O, Si, or N; and n is an integer from 1 to 4. Useful reactive (meth)acrylate monomers include glycerol derivatives, trimethlyopropane derivatives, and pentaerythritol derivatives. Particular examples include trimethylopropane triacrylate, hexanediol dimethacrylate (HDDMA), hexanediol diacrylate, butanediol dimethacrylate, ethylene glycol dimethacrylate, and ethylene glycol diacrylate. Other multifunctional monomers are described in Roberts et al.

The (meth)acrylic resin monomer may comprise an ester, urethane, or (meth)acrylate based polymer or oligomer, bearing one or more reactive (meth)acrylate groups. In some embodiments, the (meth)acrylic resin monomer is a polyalkyl (meth)acrylate having pendant (meth)acrylate groups. For example, the (meth)acrylic resin monomer may comprise a polymer comprising the reaction product of: polymerized units of free radically polymerizable ethylenically unsaturated monomers, and polymerized units derived from an ethylenically unsaturated monomer possessing polymerizable functional groups; these types of materials are described in U.S. Pat. No. 6,448,301 (Gaddam et al.). One particular example of a useful (meth)acrylic resin monomer is a polybutyl methacrylate with pendant or terminal (meth)acrylate groups.

Another (meth)acrylic resin monomer is described in U.S. Pat. No. 6,340,733 (Slark et al.) and may be represented by the formula:

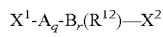

$X^1-A_q-B_r(R^{12})-X^2$ wherein A represents a residue of at least one (meth)acrylate monomer; B represents a residue of at least one monomer copolymerizable with A; $R^{12}$ represents a (meth)acrylate functionalized pendant ester group; $X^1$ and $X^2$ represent terminal groups which may be the same or different; and q and r are both at least 1 and are chosen such that the polymer has a number average molecular weight of greater than 2000.

Another useful polyalkyl(meth)acrylate resin monomer is the ELVACITE family of polymers available from Lucite International. These are typically derived from methyl methacrylate, ethyl methacrylate and n-butyl methacrylate monomers. An exemplary example is ELVACITE 4059 which comprises a copolymer of methyl methacrylate and butyl methacrylate.

The prepolymer composition can also include additional monomers such as those represented by the formula:

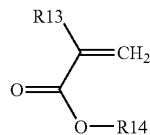

where $R^{13}$ is hydrogen or —$CH_3$; and $R^{14}$ is ($C_1$-$C_{12}$)alkyl, ($C_6$-$C_{12}$)aryl, or ($C_7$-$C_{17}$)arylalkyl.

The photoinitiator can comprise any useful photoinitiator. In some embodiments, the photoinitiator includes hydroxyalkylbenzophenones (e.g., DAROCUR available from Merck), benzoin ethers, alkylphenones, benzophenones, xanthones, thioxanthones, phosphine oxides (e.g., IRGACURE 819 available from Ciba Specialty Chemicals), substituted alpha-ketols, aromatic sulfonyl chlorides, photoactive oximes, or their derivatives. Additional useful photoinitiators are described in U.S. Pat. No. 5,516,455. Suitable thermal initiators which may be utilized include, but are not limited to, those selected from azo compounds, such as 2,2'-azobis (isobutyronitrile); hydroperoxides, such as tert-butyl hydroperoxide; and, peroxides, such as benzoyl peroxide and cyclohexanone peroxide. The photoinitiator or thermal initiator can be present in the composition in any useful amount, such as from 0.01 to 10 wt. %, from 0.1 to 5 wt. %, or from 1 to 2 wt. %.

One exemplary liquid crystal composition includes from 60 to 95 wt. % liquid crystal material, from 5 to 40 wt. % prepolymer composition, and from 0.1 to 5 wt. % photoinitiator with respect to the prepolymer composition. In this example, the prepolymer composition includes from 60 to 85 wt. % of silane-containing monomer, from 5 to 30 wt. % of multifunctional (meth)acrylate monomer, and from 5 to 30 wt. % of (meth)acrylic resin monomer.

Another exemplary liquid crystal composition includes from 70 to 95 wt. % liquid crystal material, from 5 to 30 wt. % prepolymer composition, and from 0.1 to 5 wt. % photoinitiator with respect to the polymer precursor. In this example, the prepolymer composition includes 40 to 95 wt. % of silane-containing monomer, from 0.05 to 65 wt. % of multifunctional (meth)acrylate monomer, and from 5 to 55 wt. % of (meth)acrylic resin monomer.

The liquid crystal composition may comprise particles having a diameter of from about 1.5 to about 10 µm. Useful particles include polymer particles.

Liquid crystal display assemblies may be made using the liquid crystal display disclosed herein. The assembly comprises at least two light reflecting liquid crystal displays of different color, wherein at least one of the displays comprises the liquid crystal display disclosed herein. An assembly could be made by stacking the displays on top of one another. Useful color combinations include two and three combinations of red, green, blue, cyan, magenta, yellow, black, and white.

The first and second substrates may be adhered together on a roll-to-roll apparatus. In one embodiment, in-situ deposition of the adhesive during the roll to roll process may be utilized.

EXAMPLES

Example Adhesive 1

Example 1 adhesive was a blend of 90% of a pressure sensitive adhesive, a copolymer of isooctylacrylate and acrylic acid (93:7), and 10% of a high Tg polymer, a copolymer of methylmethacrylate, butylmethacrylate, and DMAEMA (69:25:6) and having a Mw~140,000 g/mol. The adhesive also contained 0.1% of Bisamide crosslinker (1,1'-(1,3-phenylene dicarbonyl)-bis-(2-methylaziridine)). The adhesive layer was formed on a release liner by coating a solvent-based composition of 20% wt. % solids in ethyl acetate, methyl ethyl ketone, and methanol, followed by drying at 60° C. for 20 minutes. Thickness was about 25 um.

Comparative Example 1 (C1)

This adhesive consisted of Lintec SY pressure sensitive adhesive (from Lintec Corp.). Thickness was about 12.5 um on both sides of a PET film.

Comparative Example 2 (C2)

This adhesive consisted of Soken 1885 (from Soken Chemical & Engineering Co., Ltd.). Thickness was about 25 um.

Comparative Example 3 (C3)

This adhesive was a copolymer of isooctylacrylate and acrylic acid in a 90:10 ratio. Thickness was about 25 um.

Comparative Example 4 (C4)

This adhesive was a copolymer of isooctylacrylate and acrylamide in a 96:4 ratio. Thickness was about 25 um.

Comparative Example 5 (C5)

This adhesive was a strip of adhesive (50 um thickness) prepared in the form of a double-sided transfer tape. The adhesive was a copolymer of isooctylacrylate, isobornylacrylate, and acrylic acid in a 84:15:1 ratio. Thickness was about 25 um.

Comparative Example 6 (C6)

This adhesive was a copolymer of isooctylacrylate and acrylic acid in a 93:7 ratio. Thickness was about 25 um.

Samples for ITO compatibility study were prepared by transferring the adhesive to a primed polyester (PET) backing (1.5 mil) and then laminating this PET tape to a PET film which was surface coated with ITO traces as shown in FIG. 2a which is a top view of the sample. Alternatively, the adhesives were coated directly on the 1.5 mil thick PET backing and the samples were laminated to the ITO coated film. Each of the examples described below had a sufficient amount of tackiness that they adhered reliably to the ITO coated polyester. If desired, moderate heating (<100° C.) could be used to further enhance the adhesion.

The resulting laminates were placed in an oven set at 60° C./90% relative humidity. The surface resistance was measured periodically and the average reading of five traces was recorded. Samples where the ITO surface was directly exposed to the same moist, warm air were also made as the control. Samples which passed the electrical test exhibited less than 20% change in ITO resistance within 3 weeks of testing. Samples which passed the appearance test remained clear and adhered well to the polyester for the duration of the test.

TABLE 1

| Example | Electrical | Appearance |
|---|---|---|
| 1 | Pass | Pass |
| Comparative 1 | Pass | Fail |
| Comparative 2 | Fail | Pass |
| Comparative 3 | Fail | Fail |
| Comparative 4 | Pass | Fail |
| Comparative 5 | Fail | Pass |
| Comparative 6 | Fail | Fail |

What is claimed is:

1. A liquid crystal display comprising first and second opposing substrates having first and second opposing surfaces, respectively, at least one of the surfaces having a metal disposed thereon, the substrates bonded together with an adhesive in contact with the metal, the adhesive comprising a blend of:
    a pressure sensitive adhesive component comprising at least one polymer having acid or base functionality,
    a high Tg polymer having a weight average molecular weight greater than 100,000 and having an acid or base functionality, and
    a crosslinker,
    wherein the functionality of the pressure sensitive adhesive component and the functionality of the high Tg polymer form an acid-base interaction when mixed.

2. The liquid crystal display of claim 1, wherein the first and second substrates comprise polymeric substrates, glass, or a combination thereof.

3. The liquid crystal display of claim 1, wherein the metal comprises indium tin oxide.

4. The liquid crystal display of claim 1, wherein the adhesive has a thickness of from about 1.5 to about 200 um.

5. The liquid crystal display of claim 1, wherein the pressure sensitive adhesive component has a weight average molecular weight of less than about 800,000 and is formed from free-radically polymerizable monomers selected from the group consisting of (meth)acrylates, vinyl monomers, and mixtures thereof.

6. The liquid crystal display of claim 1, wherein the pressure sensitive adhesive component comprises from about 70 to about 90 wt. % of the adhesive.

7. The liquid crystal display of claim 1, wherein the high Tg polymer has a Tg greater than about 20° C.

8. The liquid crystal display of claim 1, wherein the high Tg polymer has a Tg greater than about 50° C.

9. The liquid crystal display of claim 1, wherein the high Tg polymer comprises a monomer selected from the group consisting of vinyl esters, (meth)acrylamide, styrenes, (meth)acrylonitriles, substituted styrenes, vinyl halides, vinyl propionate, (meth)acrylates, and mixtures thereof.

10. The liquid crystal display of claim 1, wherein the high Tg polymer comprises a basic copolymer.

11. The liquid crystal display of claim 1, wherein the high Tg polymer comprises a domain size of less than about 100 nm.

12. The liquid crystal display of claim 1, wherein the crosslinker is selected from the group consisting of multifunctional aziridines, peroxides, benzophenones, triazines, monoethylenically unsaturated mono-, di-, and trialkoxy silane compounds, diacrylates, triacrylates, and tetraacrylates, isocyanates, epoxies, and mixtures thereof.

13. The liquid crystal display of claim 1, wherein the first and second opposing substrates are separated by a cell gap, and the cell gap comprises a liquid crystal composition.

14. The liquid crystal display of claim 13, wherein the liquid crystal composition comprises a cholesteric liquid crystal composition.

15. The liquid crystal display of claim 13, wherein the liquid crystal composition is photocurable or thermally curable.

16. The liquid crystal display of claim 13, wherein the liquid crystal composition comprises a prepolymer composition, the prepolymer composition comprising:
    a silane-containing (meth)acrylate monomer, and
    a multifunctional (meth)acrylate monomer.

17. The liquid crystal display of claim 13, wherein the liquid crystal composition comprises a prepolymer composition, the prepolymer composition comprising:
    a silane-containing (meth)acrylate monomer,
    a (meth)acrylic resin monomer, and
    a multifunctional (meth)acrylate monomer.

18. The liquid crystal display of claim 13, wherein the liquid crystal composition is photocured or thermally cured.

19. The liquid crystal display of claim 13, wherein the liquid crystal composition comprises the cured reaction product of a prepolymer composition, the prepolymer composition comprising:
    a silane-containing (meth)acrylate monomer, and
    a multifunctional (meth)acrylate monomer.

20. The liquid crystal display of claim 13, wherein the liquid crystal composition comprises the cured reaction product of a prepolymer composition, the prepolymer composition comprising:
- a silane-containing (meth)acrylate monomer,
- a (meth)acrylic resin monomer, and
- a multifunctional (meth)acrylate monomer.

21. The liquid crystal display of claim 13, wherein the liquid crystal composition comprises particles having a diameter of from about 1.5 to about 10 um.

22. A method of manufacturing a liquid crystal display, comprising:
- providing first and second substrates having first and second surfaces, respectively, at least one of the surfaces having a metal disposed thereon;
- providing a pressure sensitive adhesive component comprising at least one polymer having acid or base functionality, a high Tg polymer having a weight average molecular weight greater than 100,000 and having an acid or base functionality, and a crosslinker, wherein the functionality of the pressure sensitive adhesive component and the functionality of the high Tg polymer form an acid-base interaction when mixed; and
- bonding the first and second substrates together using an adhesive, wherein the adhesive is in contact with the metal.

23. The method of claim 22, wherein the adhesive is in the form of a layer, the layer having a plurality of features on an outer surface thereof.

24. The method of claim 22, wherein the first and second substrates are separated by a cell gap, and the method further comprises disposing a liquid crystal composition into the cell gap.

25. A liquid crystal display assembly comprising:
- two light reflecting liquid crystal displays of different color, wherein at least one of the displays comprises the liquid crystal display of claim 1.

* * * * *

UNITED STATES PATENT AND TRADEMARK OFFICE
CERTIFICATE OF CORRECTION

PATENT NO. : 8,034,254 B2
APPLICATION NO. : 11/962488
DATED : October 11, 2011
INVENTOR(S) : Audrey A Sherman Page 1 of 1

It is certified that error appears in the above-identified patent and that said Letters Patent is hereby corrected as shown below:

Column 7,
Lines 54-58, delete

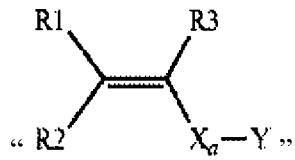

and insert

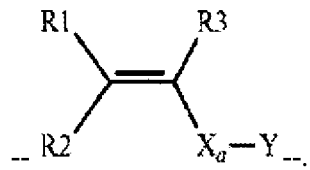

Column 8,
Line 37, after "thereof" insert -- . --.
Line 48, delete "TI" and insert -- II --.

Column 10,
Line 33, delete "thereof" and insert -- thereof. --.

Signed and Sealed this
Fourteenth Day of February, 2012

David J. Kappos
*Director of the United States Patent and Trademark Office*